(12) United States Patent
McIntosh et al.

(10) Patent No.: US 7,647,238 B2
(45) Date of Patent: Jan. 12, 2010

(54) COMPUTER-IMPLEMENTED VEHICLE REPAIR CLAIMS RULES GENERATOR SYSTEM

(75) Inventors: Prudence A McIntosh, Marine City, MI (US); D. Paul Stannard, Windsor (CA); Joan B Rabaut, Harper Woods, MI (US); Michael J Mahoney, Clinton Township, MI (US); Danny L Laethem, Eastpointe, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 2137 days.

(21) Appl. No.: 09/800,697

(22) Filed: Mar. 7, 2001

(65) Prior Publication Data

US 2002/0128874 A1 Sep. 12, 2002

(51) Int. Cl.
*G06Q 40/00* (2006.01)
(52) U.S. Cl. .............................. 705/4; 707/10; 701/33
(58) Field of Classification Search ............... 705/4; 707/10; 701/33
See application file for complete search history.

(56) References Cited

U.S. PATENT DOCUMENTS

| 4,658,370 A | * | 4/1987 | Erman et al. .................. 706/60 |
| 4,987,538 A | | 1/1991 | Johnson et al. ................ 705/2 |
| 5,253,164 A | | 10/1993 | Holloway et al. .............. 705/2 |
| 5,586,313 A | * | 12/1996 | Schnittker et al. ......... 707/104.1 |
| 5,950,169 A | * | 9/1999 | Borghesi et al. ............... 705/4 |
| 5,962,107 A | * | 10/1999 | Lowery et al. ............. 428/131 |
| 5,970,464 A | * | 10/1999 | Apte et al. ..................... 705/4 |
| 6,366,199 B1 | * | 4/2002 | Osborn et al. ............... 340/438 |
| 6,892,317 B1 | * | 5/2005 | Sampath et al. ................ 714/4 |
| 6,959,235 B1 | * | 10/2005 | Abdel-Malek et al. ........ 701/33 |
| 2002/0035488 A1 | * | 3/2002 | Aquila et al. .................. 705/4 |

* cited by examiner

*Primary Examiner*—Vanel Frenel
(74) *Attorney, Agent, or Firm*—Ralph E. Smith

(57) ABSTRACT

A computer-implemented warranty knowledge base construction system and method. An user interface receives a first rule related to vehicle repair claim processing. A rules syntax data store stores syntax rules for constructing repair claim-related rules. A knowledge base generator module connected to the user interface and to the rules syntax data store determines whether the first rule is in an acceptable syntax based upon the stored syntax rules. The first rule is used in a knowledge base system to process repair claims.

20 Claims, 9 Drawing Sheets

Fig 3

| Name | Description | Message Code | Method Name |
|---|---|---|---|
| LB7 | Labor hours must be greater than zero or NO CHARGE... | LB7 | ApplyMLB7Rule |
| LB8 | Sublet allowance only claimable in conjunction with su... | LB8 | ApplyMLB8Rule |
| LB9 | Sublet processing allowance is excessive | LB9 | ApplyMLB9Rule |
| LE4 | Excessive number of LOP's on a Recall condition | LE4 | ApplyMLE4Rule |
| LG1 | Duplicate labour operation on the same condition | LG1 | ApplyMLG1Rule |
| LH3 | Parts costs exceeds DSA authorized limits | LH3 | ApplyMLH3Rule |
| LH4 | Parts used do not support repair performed | LH4 | ApplyMLH4Rule |
| LK2 | Diagnostic operation LOP not applicable to transaction... | LK2 | ApplyMLK2Rule |
| MC6 | Parts markup adjusted | MC6 | ApplyMC6Rule |

Clauses For Rule 'LB7':

| Sequence | Clause Type | LHS Expression | Association Operator | RHS Expression | Logical Operator |
|---|---|---|---|---|---|
| 1 | Premise | the condition labor input hours | is | less than or equal to zero | AND NOT |
| 2 | Premise | the condition labor is non-charge... | | | |
| 3 | Action | the GCS business policy messag... | is set to | INVALID - labor hours must be gr... | |

Select a policy rule clause and click the right mouse button to view its derivation(s)

GCS Rules Administration System

GCS  Help

Business Policy Rules

Rule Book | Business Terms

| Term | Description | Clause Type | Expression Side |
|---|---|---|---|
| ConditionLaborInputHours | the condition labor input hours... | Premise | Left hand Side |
| ConditionLaborMaxAllowPartExpense | the total condition labor maximum allowable part expense | Premise | |
| ConditionLaborPartExpenseVariance | the condition labor part expense variance | Premise | Right Hand Side |
| ConditionLOP | the condition service labour operation | Premise | Left hand Side |
| ConditionPartCalculatedAmount | the total condition part calculated amount | Premise | |
| ConditionSequenceNumber | the sequence number of any condition | Premise | |
| ConditionTechnicianIDInvalid | the technician ID on any condition | Premise | |
| ConditionTransactionTypeIsForP | the condition transaction type is 'F' or 'P' | Premise | |
| ConditionTransactionIsP | the condition transaction type is 'P' | Premise | |
| ConditionTransactionType | the condition transaction type | Premise | Left hand Side |
| ConditionTransactionTypeNOTVorF | the condition transaction type is not a 'V' or 'F' | Premise | |
| ConditionTransactionTypesVandF | the condition transaction type is 'V' or 'F' | Premise | |
| ConditionTransTypIsEitherTCRorSAFE | the condition transaction type is either a TCR or SAFETY tran... | Premise | |
| ContinuationSubmission | the claim is a 'Continuation' submission | Premise | Right Hand Side |
| ContractTransactionType | a 'Service Contract' transaction type | Premise | Right Hand Side |
| CountAllClaimSpecialServiceLOPs | the total number of special service labor operation's on the cl... | Premise | Left hand Side |
| CountConditionSubletProcessingAllow... | the number of any specific condition sublet processing allow... | Premise | |
| CountOfConditionLaborSpecialServices | the number of condition labor special services | Premise | Left hand Side |
| CountofConditions | the total number of conditions | Premise | Left hand Side |
| CountOfParts | the total number of parts on the claim | Premise | Left hand Side |
| DataFieldsAllAlphabetic | an input data field that is all alphabetic characters | Premise | Right Hand Side |
| DataFieldsAllNumeric | an input data field that is all numeric digits | Premise | Right Hand Side |
| DataFieldIsBlank | an input data field that is all spaces | Premise | Right Hand Side |

Edit  New  Delete  Save

COMPUTER-IMPLEMENTED VEHICLE REPAIR CLAIMS RULES GENERATOR SYSTEM

BACKGROUND OF THE INVENTION

Field of the Invention

The present invention relates generally to computer-based vehicle warranty and repair administration systems and more particularly, to computer-based vehicle warranty and repair expert systems.

BACKGROUND AND SUMMARY OF THE INVENTION

Automotive dealerships handle many different vehicle repairs which generate a corresponding number of warranty processing requirements. For example, a dealership must be able to detect when a vehicle is still under warranty for a repair or whether a vehicle is subject to a recall.

The problem of warranty processing is even further compounded if warranties from dealerships from different states of the United States or of different countries must be processed. A state may impose warranty processing regulations that are different from another state. Likewise, the warranty processing regulations of the United States may be significantly different from the regulations of Mexico.

An existing approach to processing warranty claims from dealerships distributed across the world was to use a rather large and difficult to maintain set of COBOL programs. A different set of COBOL programs was used for each major geographic region. The processing requirements were hard-coded in COBOL programs so that a change in warranty processing requirements necessitated a COBOL source code change in one or more of the sets of COBOL programs. To locate where the source code change had to occur was difficult and tedious, with unexpected effects occasionally occurring after the changes were implemented.

A specific example of a warranty processing problem is that if a vehicle is damaged while in route to a dealership, the carrying company is responsible for the damage. Typically, the vehicle manufacturer would pay the dealership for the damage in route. The carrying company would reimburse the vehicle manufacturer for the damage. However, due to the distributed nature of vehicle delivery and the vast number of vehicles that are delivered, the vehicle manufacturing company experienced great difficulty in associating the damaged vehicles with the carrying company and with the dealership. Invariably, the vehicle manufacturer was not able to recoup fully from the carrying company the monies paid to the dealership. Moreover, if damage is not reported quickly enough, the carrying company may refuse to pay for the damage.

The present invention overcomes the aforementioned disadvantages as well as other disadvantages. In accordance with the teachings of the present invention, a computer-implemented warranty knowledge base construction system and method are provided. An user interface receives a first rule related to vehicle repair claim processing. A rules syntax data store stores syntax rules for constructing repair claim-related rules. A knowledge base generator module connected to the user interface and to the rules syntax data store determines whether the first rule is in an acceptable syntax based upon the stored syntax rules. The first rule is used in a knowledge base system to process repair claims.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIGS. 3-9 are computer screen displays showing different detailed views of the repair claim processing expert rules system.

DETAILED DESCRIPTION OF THE PREFERRED EMBODIMENTS

Figure 1:
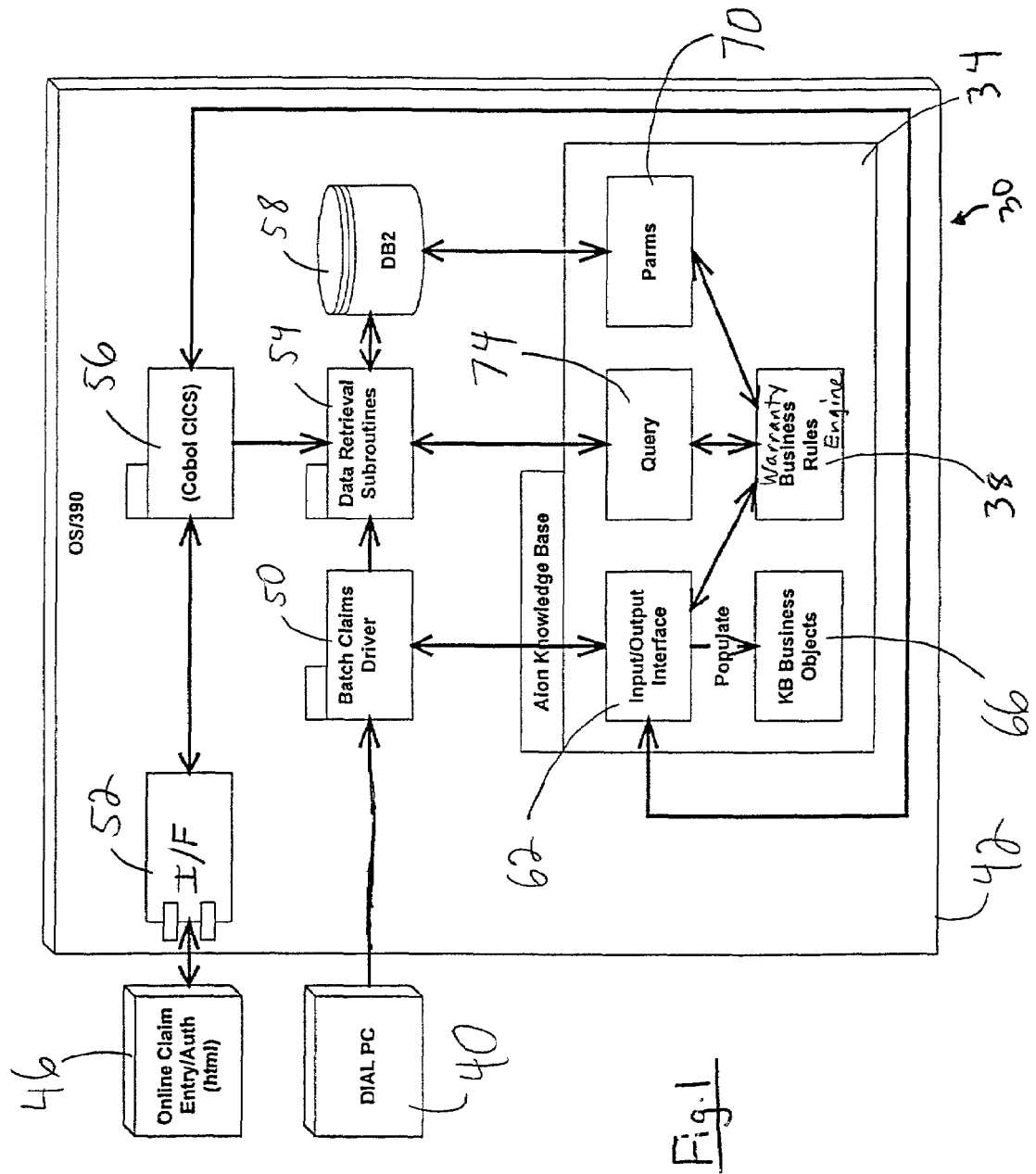
FIG. 1 is a system block diagram depicting the repair claim processing expert rules system of the present invention.

FIG. 1 depicts an unique computer networked system 30 for processing vehicle warranty claims via a single expert system 34. The one integrated expert system 34 preferably uses expert repair claim rules 38 in a knowledge base system to process the many warranty claims that are generated by the different dealerships throughout the world. It should be understood that the present invention applies to vehicle repair claim processing as well as to the more specific repair claim type Dealers provide repair claims through one of a number of different types of front-end interfaces. As a non-limiting example, dealers can utilize a dial up personal computer (PC) 40 as a front-end to connect to the back-end system 42 that contains warranty expert system 34.

Other types of interfacing computers include general purpose computers with Internet web browsing capability. The web browsers connect to the back-end system 42 via an Internet connection. Another type of front-end includes a dealer mailing a warranty claim to the vehicle's manufacturer so that the vehicle manufacturer can input the warranty data through front-end computer system 46.

In an exemplary embodiment, computers 40 and 46 communicate with the back-end system 42 through different software modules. Computer 40 communicates with the back-end system 42 through the batch claims driver software module 50. Computer 46 communicates with the back-end system 42 through interface software 52. Computers 40 and 46 provide such warranty data as the dealer involved in the transaction, the vehicle identification number (VIN), the parts involved in the repair operation, the labor operation code (LOP), etc.

With respect to computer 40, the batch driver software module 50 processes the input warranty data by invoking data retrieval subroutines software module 54 in order to retrieve from database 58 any additional information needed to process the warranty claim. With respect to computer 46, another software program 56 invokes data retrieval subroutines software module 54 in order to retrieve from database 58 any additional information needed to process the warranty claim.

For example, data retrieval subroutines software module 54 may retrieve information related to whether the vehicle is still under warranty from database 58. As another non-limiting example, information related to what type of warranty the vehicle is under may also be retrieved from database 58. In the preferred embodiment, data retrieval subroutines software module 54 uses structured query language (SQL) commands to retrieve the information from a relational database management system, such as the DB2 relational database management system from IBM.

The input warranty data and additional data retrieved from database 58 are provided to the knowledge base expert system 34. In the preferred embodiment, the knowledge base system is an Aion system which is available from Computer Associates, Inc.

Knowledge base system 34 uses warranty rules engine 38 to evaluate the input warranty data and the additional data from database 58. Input/output interface 62 allows "outside" software modules to communicate with the warranty expert rules 38. These "outside" software modules include but are not limited to the batch claims driver software module 50 and software module 56. Input/output interface 62 provides a standard mechanism to communicate with the knowledge base system and to populate the knowledge base system with knowledge warranty business objects 66. An example of a knowledge warranty business object 66 is the "dealer" object which has the attributes relating to the dealer such as for example address, labor rates, and technician identification.

Input/output interface 62 also provides an interface for an user to view the repair claim-related expert rules. The present invention uses a lower level representation of the repair claim-related expert rules when the rules are being executed, but uses a high level computer expression format (such as an English phrase format) to display to an user the high level computer expression format of the repair claim-related expert rules. This provides an unique advantage of allowing non-computer programmers to create and/or evaluate repair claim-related expert rules since the rules are displayed to them in an English phrase format.

Warranty business rules engine 38 processes the data provided by input/output interface 62 by applying such rules as whether the parts indicated in the input data make sense relative to the labor that is being performed. For example, a labor operation code for warranty work on brakes would not involve engine parts since another labor operation code would be used for that work.

If warranty business rules engine 38 needs additional information from database 58, then warranty business rules engine 38 uses the parms software module 70 to query database 58 for the additional information. The parms software module 70 uses SQL commands to perform the queries.

Warranty business rules engine 38 uses the query module 74 in order to interface with the data retrieval subroutines 54. As a non-limiting example, this is done conditionally when additional historical information is required to validate a claim.

Figure 2:
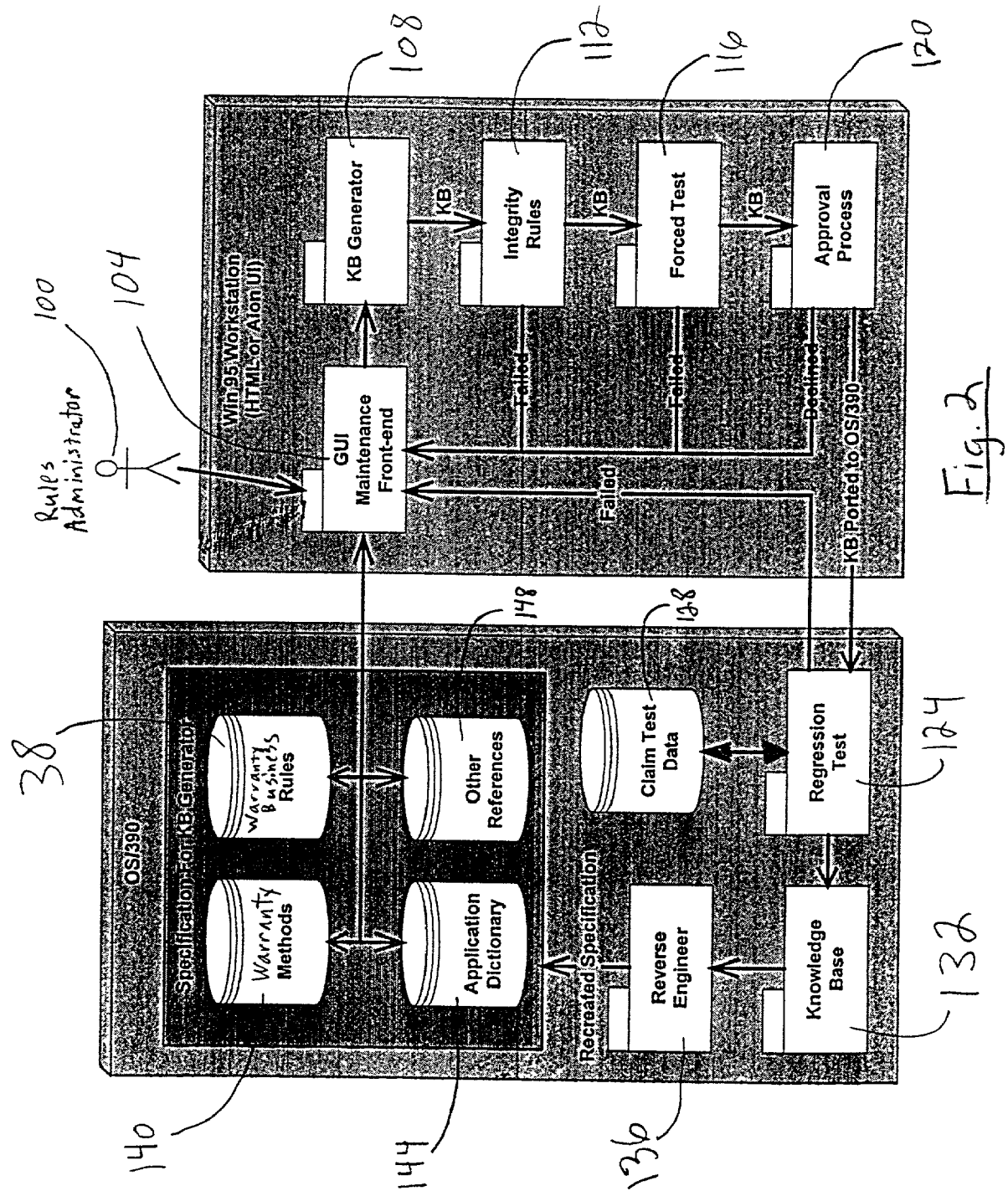
FIG. 2 is a system block diagram depicting the creation of the repair claim processing expert rules of the present invention.

FIG. 2 depicts a computer system block diagram for creating and maintaining the integrity of the large set of warranty business rules used by the present invention. In the preferred embodiment, a rules administrator 100 uses a graphical user interface (GUI) 104 to enter and test new and existing warranty rules. The rules administrator may be entering new warranty rules due to a change in a state warranty law and wants to ensure that none of the current warranty rules are inconsistent with the new warranty rules.

An unique advantage of GUI 104 is that rules administrator 100 uses English phrases to express the warranty rules. Previous expert rules-based systems mandated that users express the rules in the programming language of the knowledge base system, such as in the C++ programming language. The present invention allows the rules administrator to focus less on programming language knowledge and focus more on the substance of the warranty rules. This advantage allows more types of users to enter in rules than only using users with an appreciable amount of programming experience as rules administrators. An example of the more English phrase-like rules approach in the present invention is the following: if the odometer reading at the time of the repair was 'excessive' (using an excessive mileage parameter), then set message code "ABC" and reject the claim." However, it should be understood that the present invention includes other different English phrases, such as "labor hours must be greater than zero", as well as expressions in other higher order languages, such as German or Italian.

GUI 104 provides knowledge base generator software module 108 with the new warranty rules from rules administrator 100. Knowledge base generator 108 uses the knowledge base consistency checking software of the Aion system to check that the rules being entered by rules administrator 100 are properly worded and using words that are understandable by the present invention. If the rules are not consistent such that they are not syntactically correct or not uniformly worded, then messages are provided to rules administrator 100 that explain the reason(s) behind the inconsistency or non-uniformity so that rules administrator 100 may provide corrective action. Once the new rules have been checked by knowledge base generator 108, the preferred embodiment provides the knowledge base generator 108 with converting the English phrase rule expressions into a programming language, such as C++.

Integrity rules software module 112 uses the knowledge base consistency checking software of the Aion system to check that the rules from knowledge base generator 108 being entered by rules administrator 100 are consistent with rules that are presently in the warranty knowledge base system of the present invention. If the rules are not consistent, then messages are provided to rules administrator 100 that explain the reason(s) behind the inconsistency so that rules administrator 100 may provide corrective action.

A forced test software module 116 provides warranty test case scenarios to test the new rules with the existing rules. If inconsistencies arise during the testing, then messages are provided to rules administrator 100 that explain the reason(s) behind the inconsistencies so that rules administrator 100 may provide corrective action. If testing does not provide inconsistencies, then approval process software module 120 provides a structured environment for personnel other than the rules administrator to approve the knowledge base with the new rules.

Once the new knowledge base is approved, regression testing software module 124 provides a larger body of scenarios via claim test data 128 to test the new knowledge base. After regression testing, the tested knowledge base 132 is processed through reverse engineering software module 136 in order to create a specification that can be used to recreate the complete knowledge base if it should become corrupted.

The specification for the knowledge base includes warranty business methods 140, warranty business rules 38, application dictionary 144, and other references 148. An example of a warranty business method 140 is the parts markup and pricing module which determines the dealer mark-up on parts. Application dictionary 144 is a reference library that identifies data elements and attributes used in the repair claims processing system. Other references 148 include other internal mainframe software libraries that are referenced during repair claims processing.

FIG. 3 depicts an exemplary computer screen for a rules administrator to use to enter and maintain warranty rules.

Each warranty rule is preferably given an unique number, such as LB7 as shown by reference numeral 200. LB7 rule 200 contains premise(s) and action(s). If the premises are evaluated as true, then the action(s) are executed. For example, the LB7 rule 200 includes two premises and one action. The first premise 202 is: (the condition labor input hours is less than or equal to zero). If the two premises of the LB7 rule 200 are together evaluated as true, then the action shown by reference numeral 204 is executed. The "ApplyLB7Rule" method 205 is the code that executes the rule.

Figure 4:
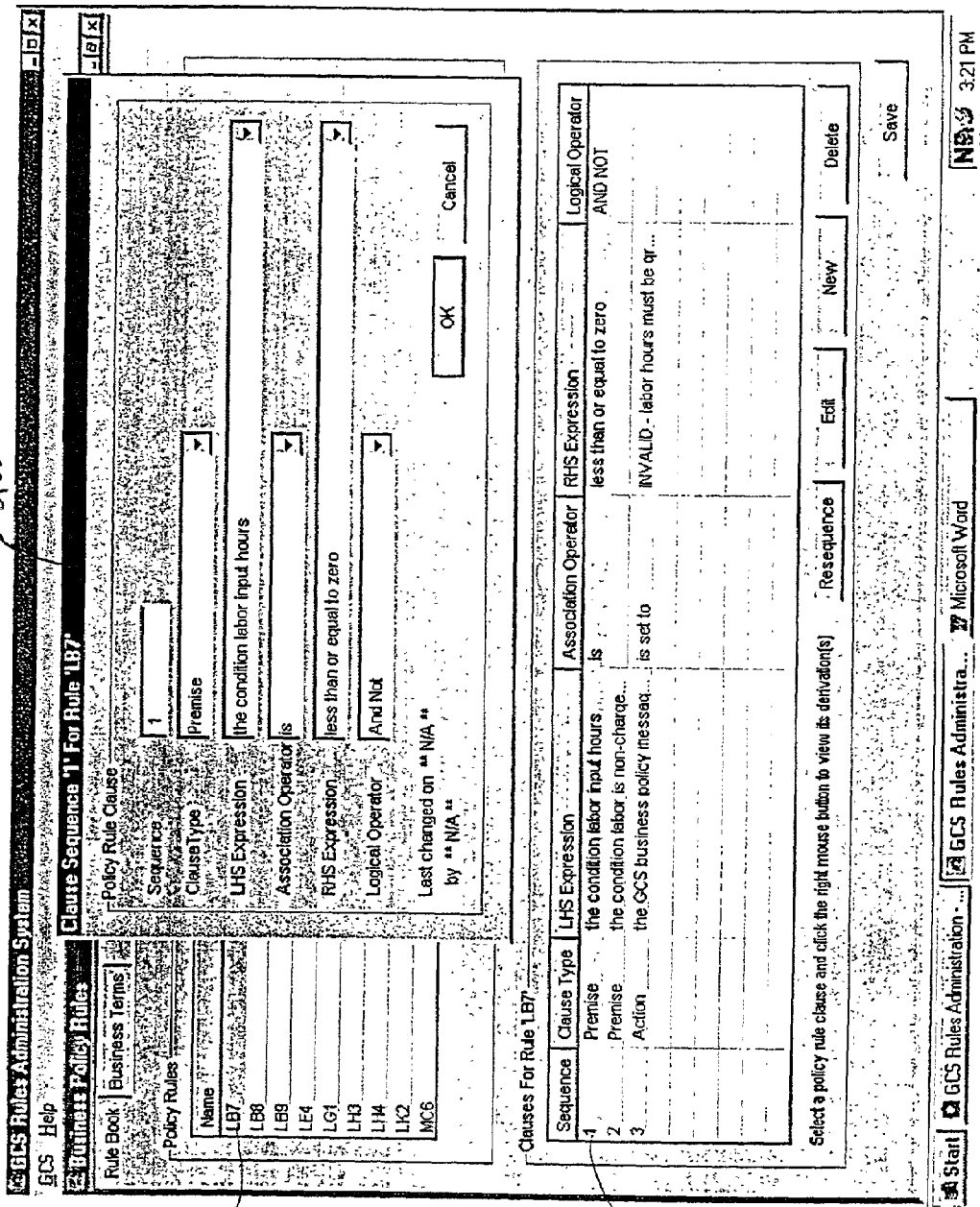
Figure 5:
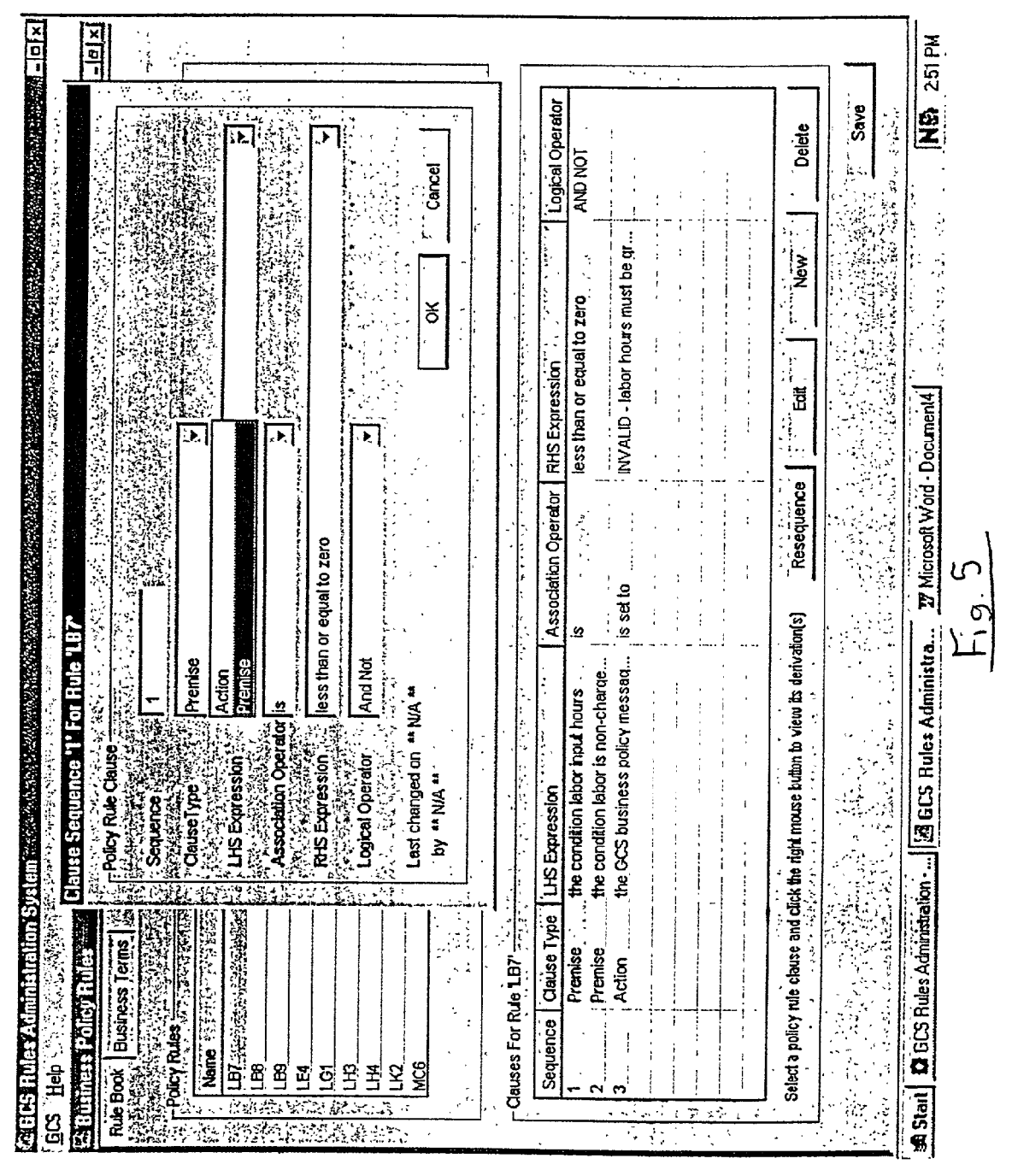
Figure 6:
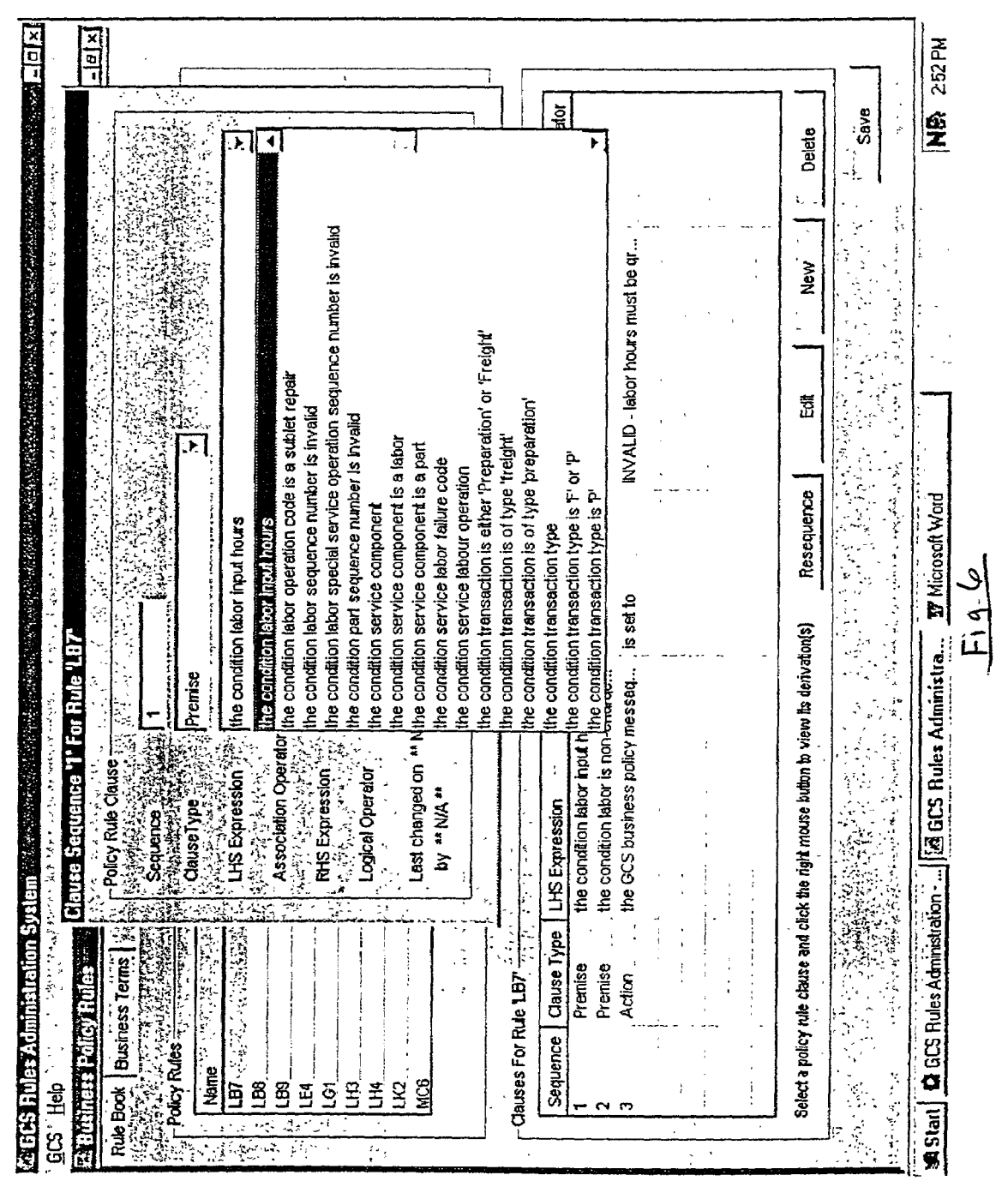

FIG. 4 depicts a computer screen that shows how the present invention enters and/or edits information related to the first premise of LB7 rule 200. FIG. 5 shows how an user can select whether an expression is an action or a premise. FIG. 6 shows how an user is able to construct English phrases for rules. A pull down box lists the different expressions that have been stored by the present invention and that can be used by rule administrators.

FIG. 7 depicts the various business terms that have been stored as variables for use by rule administrators to construct rules. Column 240 entitled "Description" details the user-friendly English phrases that a rules administrator uses to build repair claim rules. Column 242 entitled "Term" shows the C++ object to which the English phrase is translated when the rules are converted by the present invention from English phrases into C++ code.

Figure 8:
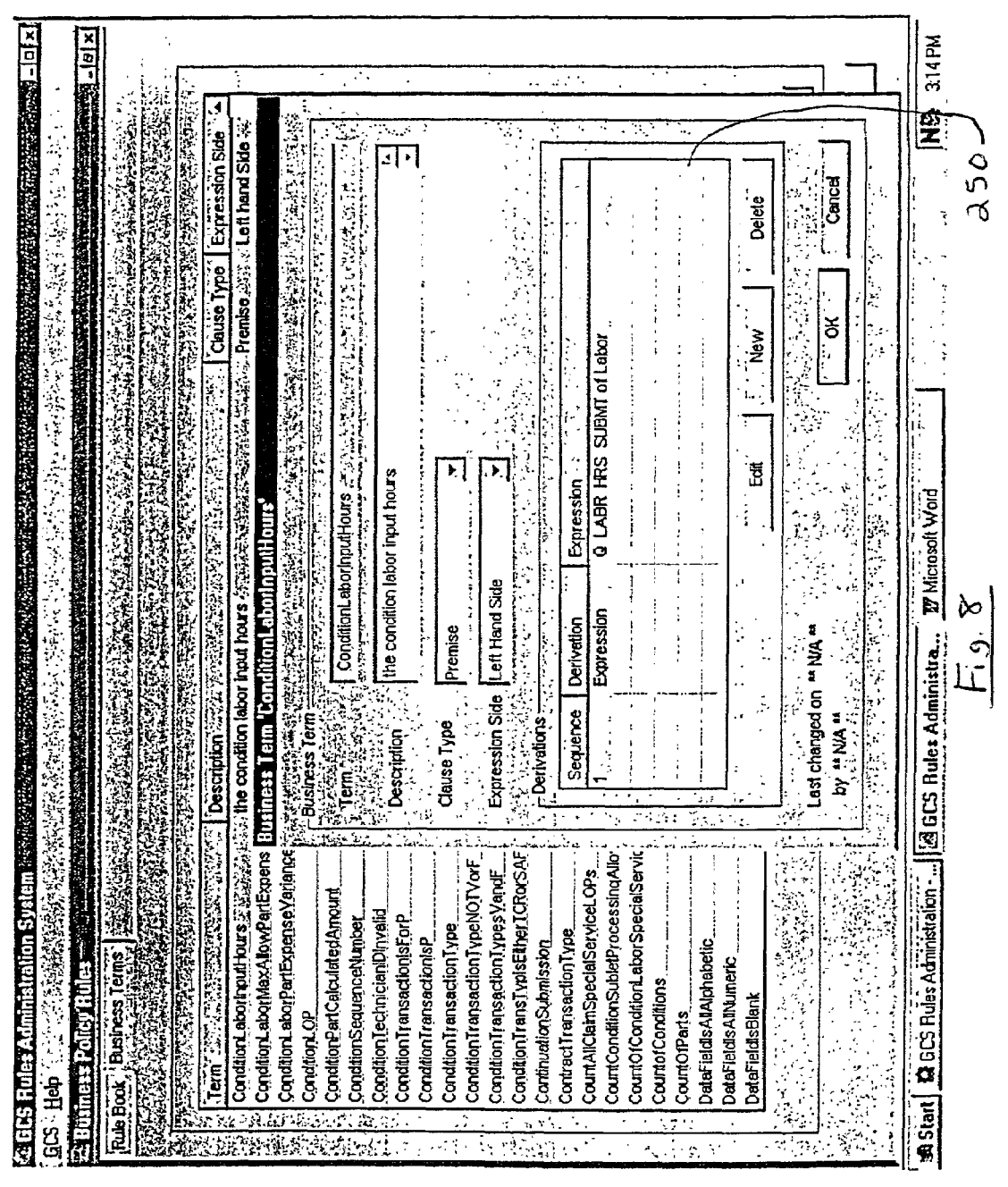
Figure 9:
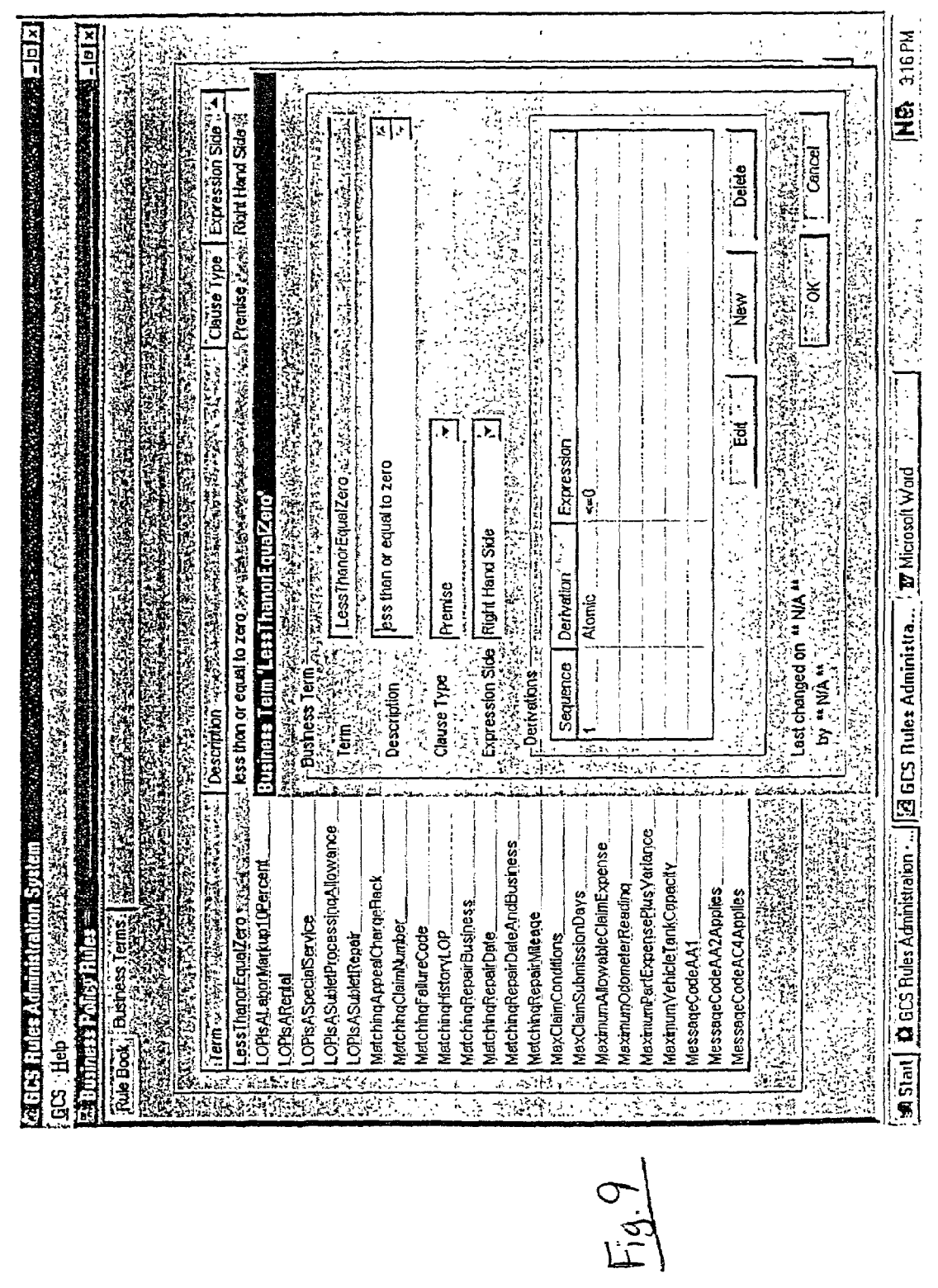

FIG. 8 shows detailed information regarding the business term "ConditionLaborInputHours", such as how it is derived. The derivation is shown in derivation region 250. This term is derived via a database command that retrieves data from the field "Q_LABR_HRS_SUBMT" from the database table "Labor". The present invention allows rules administrators to build rules from preexisting constructs, such as from already existing phrases. FIG. 9 shows the business term "LessThanorEqualZero" which has an atomic derivation with an expression of "<=0".

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer-implemented warranty knowledge base construction system, comprising:
   a computer having:
   a user interface for receiving a first rule related to vehicle repair claim processing;
   a rules syntax data store that stores syntax rules for constructing repair claim-related rules;
   a knowledge base generator module connected to the user interface and to the rules syntax data store for determining whether the first rule is in an acceptable syntax based upon the stored syntax rules; and
   a knowledge base system wherein the first rule is used to process repair claims.

2. The system of claim 1 wherein a knowledge base stores a plurality of repair claim-related expert rules to evaluate a repair claim, said system further comprising:
   an integrity rules module connected to the knowledge base generator module in order to determine whether the first rule is consistent with respect to at least one of the warranty-related expert rules that is stored in the knowledge base.

3. The system of claim 2 wherein the first rule is incorporated into the knowledge base, said system further comprising:
   a testing module for testing the knowledge base with testing scenarios.

4. The system of claim 2 wherein the first rule is incorporated into the knowledge base, said system further comprising:
   a testing module for performing regression testing of the knowledge base.

5. The system of claim 2 further comprising:
   a reverse engineer module for generating a specification for the knowledge base.

6. The system of claim 5 wherein the specification for the knowledge base includes warranty methods and warranty business rules.

7. The system of claim 2 wherein the first rule contains a high level computer expression, said knowledge base generator evaluating the high level expression as to whether the high level expression of the first rule is in an acceptable syntax based upon the stored syntax rules.

8. The system of claim 7 wherein the knowledge base generator generates a lower level representation of the first rule if the first rule is in an acceptable syntax.

9. The system of claim 8 wherein the high level computer expression of the first rule is an English phrase, wherein the lower level representation of the first rule is at least one line of programming code.

10. The system of claim 9 wherein the programming code is C++ programming code.

11. A computer-implemented warranty knowledge base construction method, comprising the steps of:
    receiving with a computer a first rule related to vehicle repair claim processing;
    storing syntax rules in the computer for constructing repair claim-related rules;
    determining with the computer whether the first rule is in an acceptable syntax based upon the stored syntax rules; and
    the computer using the first rule in a knowledge base method to process repair claims.

12. The method of claim 11 including evaluating a repair claim with the computer using a plurality of repair claim-related expert rules stored in a knowledge base of the computer, and
    determining with the computer whether the first rule is consistent with respect to at least one of the repair claim-related expert rules that is stored in the knowledge base.

13. The method of claim 12 including incorporating with the computer the first rule into the knowledge base and testing the knowledge base with testing scenarios.

14. The method of claim 12 including incorporating with the computer the first rule into the knowledge base, and performing regression testing of the knowledge base.

15. The method of claim 12 further comprising the steps of:
    using a reverse engineer module for generating a specification for the knowledge base.

16. The method of claim 15 wherein the specification for the knowledge base includes warranty methods and warranty business rules.

17. The method of claim 12 wherein the first rule contains a high level computer expression, said method further comprising the step of:
    evaluating the high level expression as to whether the high level expression of the first rule is in an acceptable syntax based upon the stored syntax rules.

18. The method of claim 17 further comprising the step of:
generating a lower level representation of the first rule if the first rule is in an acceptable syntax.

19. The method of claim 18 wherein the high level computer expression of the first rule is an English phrase, wherein the lower level representation of the first rule is at least one line of programming code.

20. The method of claim 19 wherein the programming code is C++ programming code.

* * * * *